United States Patent [19]
Schilling et al.

[11] Patent Number: 4,913,623
[45] Date of Patent: Apr. 3, 1990

[54] PROPELLER/FAN-PITCH FEATHERING APPARATUS

[75] Inventors: Jan C. Schilling, Middletown; Arthur P. Adamson, Cincinnati; Julius Bathori, Cincinnati; Neil Walker, Cincinnati, all of Ohio

[73] Assignee: General Electric Company, Cincinnati, Ohio

[21] Appl. No.: 196,888

[22] Filed: May 20, 1988

Related U.S. Application Data

[63] Continuation-in-part of Ser. No. 797,346, Nov. 12, 1985.

[51] Int. Cl.⁴ .............................................. B64C 11/34
[52] U.S. Cl. ...................................... 416/51; 416/129; 416/139
[58] Field of Search .................... 416/46, 51 R, 51 A, 416/52 R, 44 R, 53 R, 53 A, 131, 139 R, 153, 154, 129 R, 171, 127; 60/39.162, 226.1, 268

[56] References Cited

U.S. PATENT DOCUMENTS

| | | | |
|---|---|---|---|
| Re. 24,530 | 9/1958 | Biermann | 416/46 |
| 1,829,443 | 10/1931 | Gobereau et al. | 416/53 |
| 2,032,254 | 2/1936 | Caldwell | 416/46 |
| 2,054,947 | 9/1936 | Riddle | 416/53 |
| 2,146,334 | 2/1939 | De Caria | 416/53 |
| 2,353,334 | 7/1944 | Haugh | 416/53 |
| 2,607,430 | 8/1952 | Dean | 416/53 |
| 3,794,442 | 2/1974 | McMurtry | 416/145 |
| 4,111,601 | 9/1978 | Richard | 416/53 A X |

FOREIGN PATENT DOCUMENTS

| | | | |
|---|---|---|---|
| 916410 | 12/1946 | France | 416/147 |
| 819032 | 8/1959 | United Kingdom | 60/226.1 |
| 1196589 | 7/1970 | United Kingdom | 60/226.1 |
| 1290485 | 9/1972 | United Kingdom | 60/226.1 |
| 1368282 | 9/1974 | United Kingdom | 416/160 |
| 2129502 | 5/1984 | United Kingdom | 416/127 |

*Primary Examiner*—Everette A. Powell, Jr.
*Attorney, Agent, or Firm*—Jerome C. Squillaro; Nathan D. Herkamp

[57] ABSTRACT

A pitch feathering system for a gas turbine driven aircraft propeller having multiple variable pitch blades utilizes a counter-weight linked to the blades. The weight is constrained to move, when effecting a pitch change, only in a radial plane and about an axis which rotates about the propeller axis. The system includes a linkage allowing the weight to move through a larger angle than the associated pitch change of the blade.

11 Claims, 9 Drawing Sheets

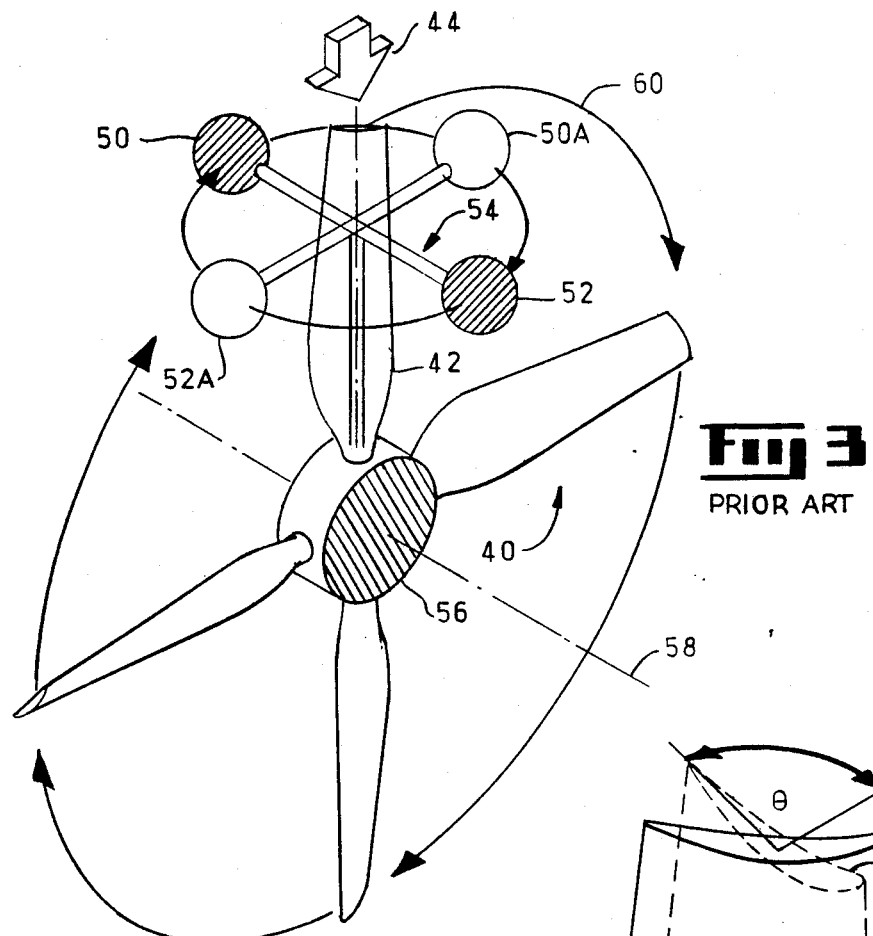
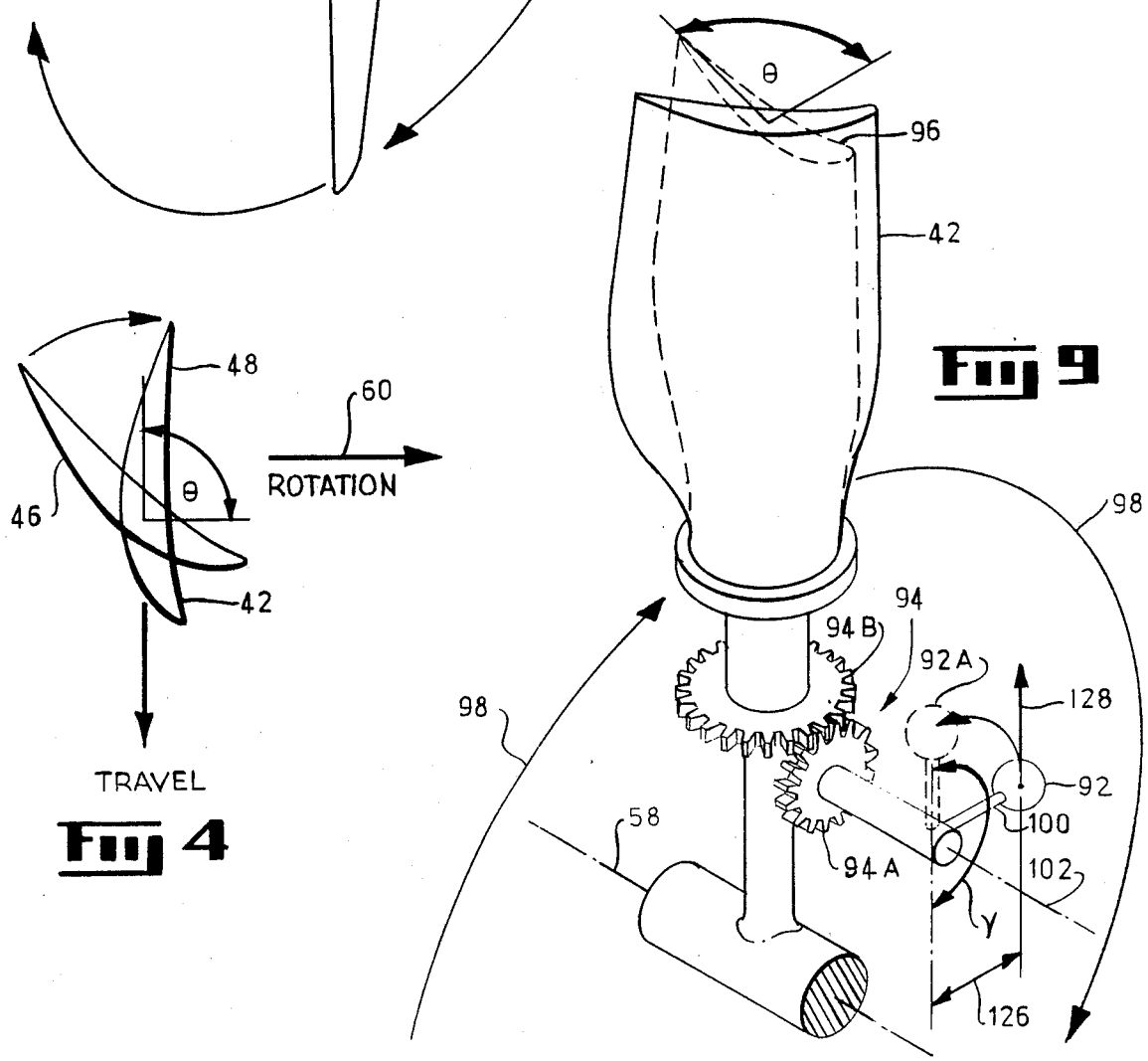

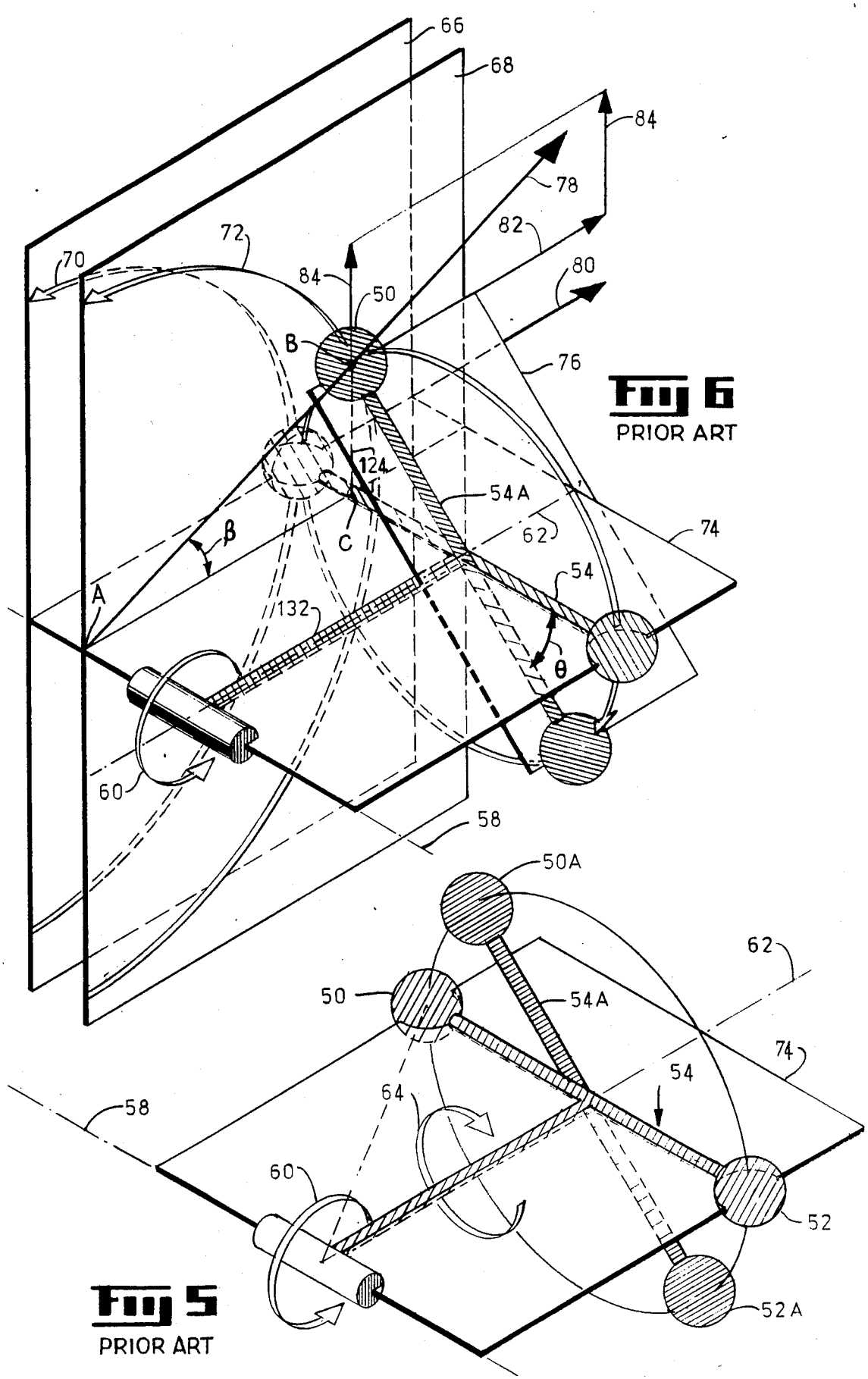

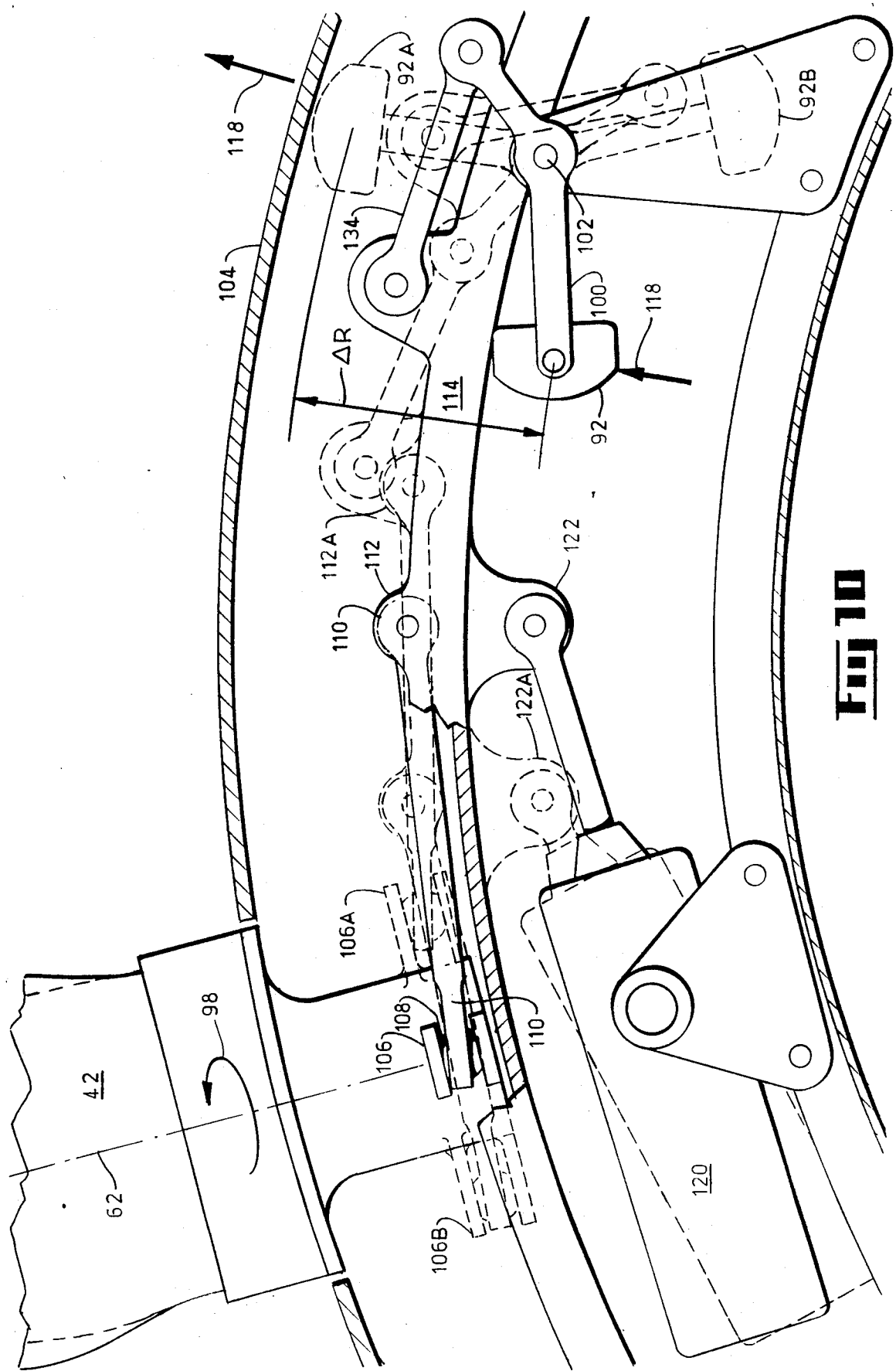

PROPELLER/FAN-PITCH FEATHERING APPARATUS

The invention herein described was made in the performance of work under a NASA contract and is subject to the provisions of Section 305 of the National Aeronautics and Space Act of 1958, Public Law 85-568 (72 Stat. 435; 42 USC 2457).

This is a continuation-in-part of patent application Ser. No. 798,346, filed Nov. 12, 1985.

The present invention relates to a system for driving blades of a multi-blade propeller to a feather position, i.e., a coarse pitch, upon failure of a pitch control mechanism.

BACKGROUND OF THE INVENTION

Mechanisms for driving propeller blades to feather positions have been employed in aircraft since the advent of the variable pitch propeller. In general, such systems employ counter-weights which act upon the pitch control mechanism to bias it toward the feather position. Further in general, the mass of such counter-weights has been selected to provide the torque necessary to effect such pitch change without consideration of the detriment to engine performance attributable to such added mass. When such prior art mechanisms are applied to gas turbine engines which may be fuselage mounted, any mass added to the engine will adversely affect engine performance, i.e., fuel efficiency, and may also require additional structural support for mounting the engine.

SUMMARY OF THE INVENTION

Among the several objects of the present invention may be noted the provision of a system for propeller blade feathering which reduces the mass required to achieve such feathering using counter-weights and the use of a few counter-weights to feather many blades; the provision of such a system in a gas turbine engine and, in particular, the application of such system to an unducted fan, fuselage mounted gas turbine engine.

In particular, the present invention is disclosed as part of an aircraft propulsor system including a gas turbine engine for generating a high energy gas stream and a propulsor stage coupled to the engine and having first and second intermeshed counterrotating turbine blade sets driven by the gas stream. Each of the turbine blade sets is operatively connected to corresponding fore and aft multi-blade propellers extending radially outward of the propulsor stage. One of the turbine blade sets has radially inwardly extending blades and a radially outer blade support ring. The other of the blade sets has radially outwardly extending blades and a radially inner blade support ring. The propulsor system includes means coupled to the fore and aft propellers for controlling their pitch. The propeller blade pitch feathering apparatus is incorporated in the system for automatically rotating the propeller blades to a predetermined pitch angle upon failure of the pitch control means. The pitch feathering means includes a first unison ring interconnecting the blades of the fore propeller and a second unison ring interconnecting the blades of the aft propellers for effecting conjoint pitch change of each of the blades. A plurality of counter-weights is coupled to each unison ring for rotation with the ring about a rotational axis of the corresponding one of the propellers. Each of the counter-weights is rotatable about an axis of rotation, which axis rotates about the propeller rotational axis. The counter-weights thus rotate in a direction which effects maximum radial displacement of the couner-weights with respect to the propeller axis and having maximum driving energy per pound of counter-weight. A mechanism couples the counter-weights to the propeller blades thus driving the blades to a predetermined feather pitch position by motion, in one embodiment, of the unison ring when the counter-weights under the influence of the centrifugal field move outward from the propeller axis. In one embodiment, the axes of rotation of the counter-weights are parallel to the propeller axis and the counter-weights are rotatable only in a plane perpendicular to the propeller axis. In another embodiment, the axis of rotation of the counter-weights lie on tangent lines of a circle circumscribing the propeller axis in a plane perpendicular to the propeller axis. Although, the counter-weights in this embodiment are rotatable only in a plane parallel to and including the propeller axis, both embodiments give maximum radial displacement compared to prior art systems and have lighter counter-weights for equal torque. In the first embodiment, there is provided a mechanism connecting the counter-weights to the unison ring and the unison ring to the blades. This system includes support means connecting the counter-weights to the radially outer blade support ring of the one of the turbine stages. A lever is pivotably mounted at an intermediate point to the support means and a corresponding one of the counter-weights is attached to one end of the lever. Another end of the lever is pivotably attached to the unison ring whereby rotation of the counter-weight about the support in parts are forced to the unison ring to effect this rotation about the propeller axis for changing the pitch of the propeller blades. In the second embodiment, a tubular member having gear teeth on each end and counter-weights attached to an outer surface is incorporated as part of the unison ring. A gear assembly is coupled to each of the propeller blades and the gear assembly is arranged to effect pitch change of the blades. One of the gears of the gear assembly is adapted for driving engagement with gear teeth of the tubular member. The tubular member extends between adjacent gear assemblies for interconnecting the assemblies for effecting a pitch change when a counter-weight forces rotation of the tubular member.

DESCRIPTION OF THE DRAWINGS

For a better understanding of the present invention, reference may be had to the following detailed description taken in conjunction with the accompanying drawings in which:

FIG. 3 schematically illustrates a typical prior art pitch restraint mechanism for a multi-blade propeller;

FIG. 4 illustrates blade pitch angles;

FIGS. 5-8 illustrate in greater detail the behavior of the prior art system of FIG. 1;

FIG. 9 schematically illustrates the operation of the present invention;

FIG. 10 is a partial cross-sectional view of an apparatus and mechanism for pitch control in one form of the present invention;

DETAILED DESCRIPTION OF THE INVENTION

Figure 1:
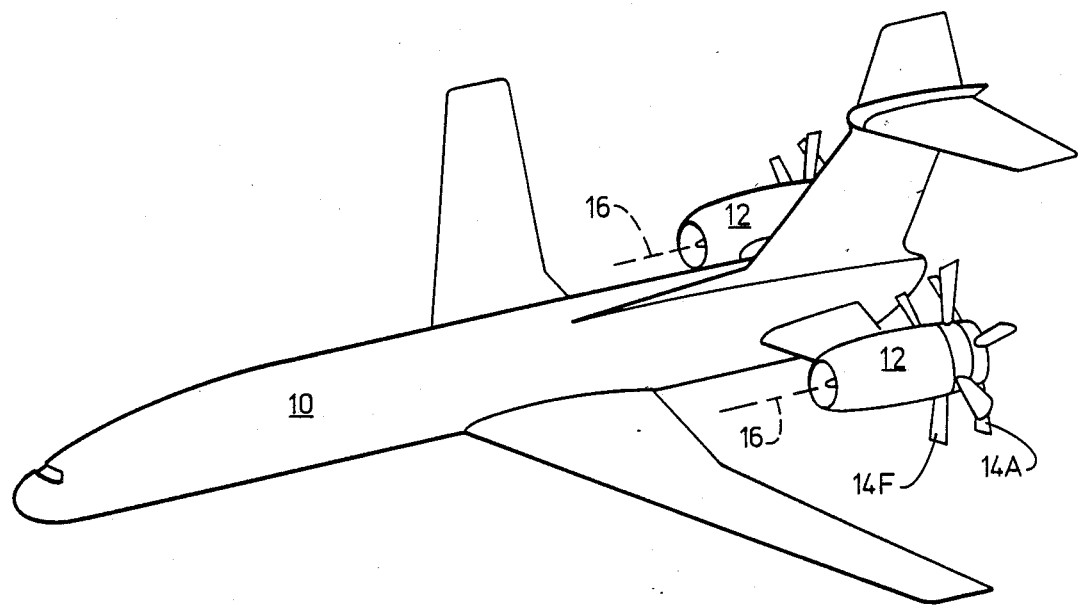
FIG. 1 illustrates an aircraft having a gas turbine engine with counterrotating fore and aft propellers.

FIG. 1 illustrates an aircraft 10 having tail-mounted gas turbine engines 12. The engines 12 each drive a fore propulsor 14F and an aft propulsor 14A which rotate in opposite directions about a propeller axis 16.

Figure 2:
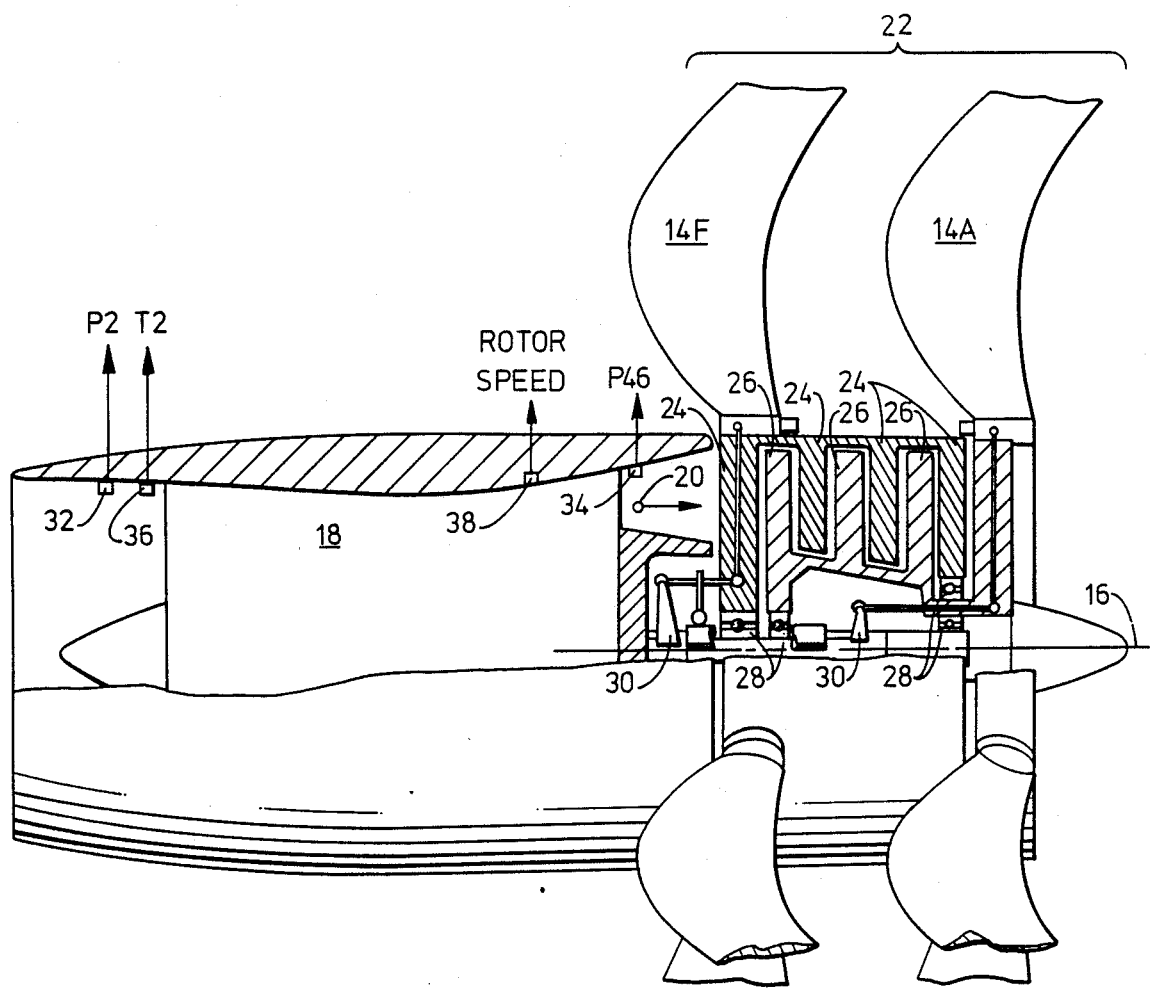
FIG. 2 is a partial cross-sectional view of one of the propellers of FIG. 1.

FIG. 2 illustrates in greater detail the engine-propulsor system of FIG. 1. To the left is the gas turbine engine 18 such as the F404 type manufactured by the assignee of the present application. For purposes of the present invention, the gas turbine engine 18 can be considered as a gas generator which generates a high energy gas stream 20 and supplies the gas stream 20 to a propulsor stage 22.

The propulsor stage 22 extracts energy from the gas stream 20 directly, by means of low-speed counterrotating turbine blade sets. (This is in distinction to the common approach of using a high-speed turbine whose speed is reduced in route to a propulsor by a reduction gearbox.) A first set of blades 24 extracts energy from the gas stream 20 and spins the forward propulsor 14F. A second set of blades 26 spins the aft propulsor 14A, but opposite in direction to fore propulsor 14F. Bearings 28 support the blade sets and propulsors and allow this counterrotation.

A pitch-change mechanism 30 for changing the pitch of the propulsors 14A and 14F is shown schematically. It is desirable to control the pitch-change mechanism 30 so that the propulsor pitch is proper under the prevailing operating conditions of the aircraft.

Various monitors are located in the engine 18 including sensors 32, 34 which provide signals representative of gas pressure (P2, P46) and sensor 36 which provides signals representative of inlet air temperature. Signal P2 (inlet air pressure) and signal P46 (air pressure exiting engine 15) are used to develop engine pressure ratio (EPR). While EPR is known to be the ratio P46/P2, it will be appreciated that for a constant P2, EPR can be obtained directly from a measurement of P46. Rotor speed is also sensed by a monitor 38 and provided as a control signal from engine 18. These sensors and others not shown are well known in the engine art. One control system for an engine such as engine 18 is described in U.S. Pat. No. 4,242,864, the disclosure of which is hereby incorporated by reference.

Furthermore, it is desirable to provide sufficient energy in the gas stream 20 to effect rotation of the propulsors 14A and 14F at a speed and selected pitch angle so as to permit such proper operation, or, more specifically, to meet a pilot's demand for engine thrust. An example of aircraft propulsor control for a propulsor driven by a gas turbine engine is given in commonly assigned U.S. patent application Ser. No. 902,231 filed Aug. 29, 1986, the disclosure of which is hereby incorporated by reference.

FIG. 3 illustrates an aircraft propeller 40 and FIG. 4 is an end-on view of the blades 42 of propeller 40, viewed in the direction of arrow 44. When the pitch, indicated as α, of the blade in FIG. 4 is changed from position 46 to position 48, aircraft drag due to a feathered propeller decreases making it desirable to move the blade to position 48. Position 48 is often called the fully feathered position of the propeller.

FIG. 5 schematically shows a pair of weights 50 and 52 forming a dumbbell 54. Rotated weights 50A and 52A are also shown. (The weights are actually contained within a propeller hub 56, but are shown outboard of the hub for ease of explanation.) The weights are attached to the propeller blade 42 and centrifugal force causes the weights to rotate through angle θ frim hatched positions 50 and 52 to unhatched positions 50A and 52A, thereby causing the propeller blade 42 to rotate into the fully feathered position 48 in FIG. 4. The cause of this rotation will be explained with reference to FIGS. 5–8. Note that for this prior art example, the weight rotation θ and the propeller blade pitch change angle are the same.

FIG. 5 illustrates two positions which the dumbbell 54 can occupy. Propeller rotation about axis 58 in FIGS. 3 and 5 is illustrated by arrow 60, and the dumbbell 54 rotates along with the propeller blades. The dumbbell 54 also rotates about a second axis 62, also shown in FIG. 3. This latter rotation causes the pitch of the propeller blades to change. The way in which centrifugal force acts to cause this pitch change (i.e., the rotation shown by arrow 64 in FIG. 5) will now be explained with reference to FIGS. 6 and 7. (As shown in FIG. 5, the dumbbell 54 is actually in a position of unstable equilibrium, having no theoretical tendency to rotate. This is better explained four paragraphs later.)

FIG. 6 illustrates four geometric planes. Planes 66 and 68 are parallel and are defined by the circles 70 and 72 in which weight 50 rotates. The two planes 66 and 68 are representative of an infinite family of such parallel planes described by the circles 70 and 72. A third plane 74 is perpendicular to planes 66 and 68, and contains the axis 62. Plane 74 also contains dumbbell 54 in FIGS. 5 and 6 corresponds to dumbbell 54 in FIG. 3.

Figure 7:
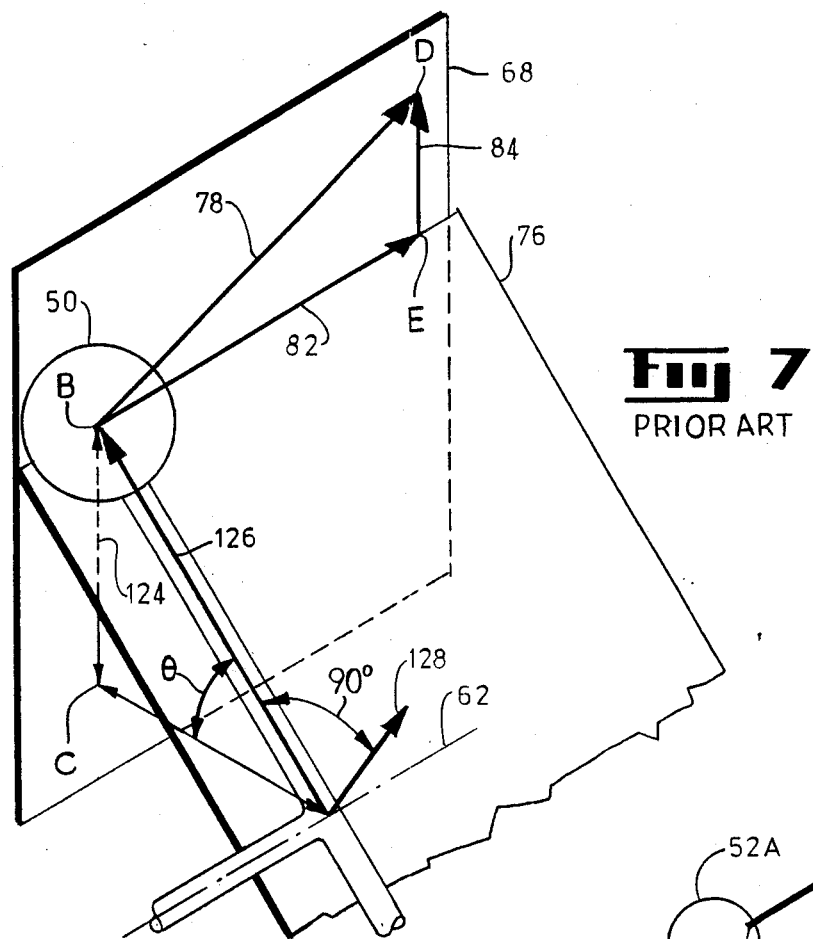

A fourth plane 76 contains dumbbell 54A when in the rotated position shown in FIGS. 5 and 6. A key point to note here is that, in general, any centrifugal force vector acts along the radius of the circle (e.g., circle 70) which rotating weight 50 described. Two such vectors are shown by arrows 78 and 80. The centrifugal force vector acting upon weight 50, when in plane 76, is shown by vector 78. Vector 78 is contained within the plane of rotation 68 defined by circle 72. The centrifugal force vector 78 is also shown in FIG. 7, but decomposed into two components 82 and 84. Rotated plane 76 is also shown in FIG. 7, as is the plane of rotation 68.

Component 82 is parallel with the axis 62, also shown in FIGS. 5 and 6, and therefore does not induce any rotation of the dumbbell in the direction of arrow 64 in FIG. 5. That is, component 82 contributes nothing to pitch change. However, component 84 is perpendicular to plane 74 in FIGS. 5 and 6, and therefore induces the rotation indicated by arrow 64 in FIG. 5. Therefore, this latter component 84 induces rotation of the dumbbell from hatched position 54 in FIG. 8, into the position shown as 54A. This latter position is contained within plane 86, which is one of the family of planes represented by planes 66 and 68 in FIG. 6.

When the dumbbell 54 in FIG. 3 is properly linked to the propeller blade 42, the rotation just described, which is induced by centrifugal force, will cause the blade to move from position 46 to position 48 in FIG. 4. It is, of course, understood that, in actual practice, dumbbell 54 will not start off exactly in plane 74 in FIGS. 5 and 6. The reason is that when the vector decomposition of FIG. 7 is applied in such a case, the rotation inducing component 84 vanishes. Thus, in theory, no rotation 64 in FIG. 5 is induced when the dumbbell 54 is exactly contained within plane 74. Therefore, in practice, it is probably desirable to start off dumbbell 54 in a position closer to that shown by dumbbell 54A in FIG. 5, that is, out of plane 74.

Figure 8:
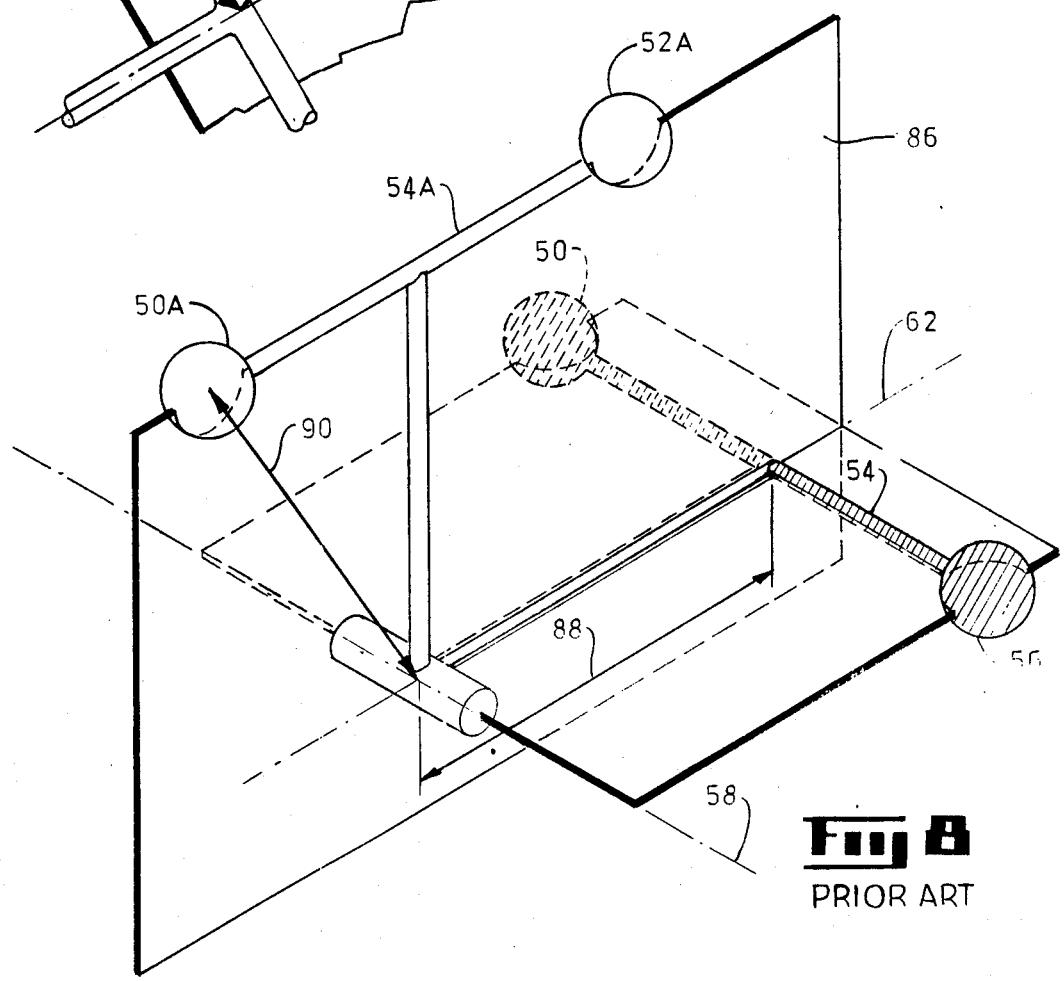

One problem with the prior art approach just described is that the work done by weight 50 in FIGS. 5 and 6 during the rotation from the theoretical initial position 54 shown in FIG. 8 to the final position 54A is given by the expression:

$$W = \int F \cdot dl,$$

where W is work, F is centrifugal force, and dl is the differential taken along the path followed by weight 50. Stated in other words, the work W is a function of the difference between radius 88 and radius 90 in FIG. 8. This difference in radius is, in general, small.

FIG. 9 illustrates schematically one form of the present invention, wherein a weight 92 coupled to a gear set 94 rotates a propeller blade 42 into a feathered position shown by phantom blade 96. The rotation of the weight 92 into phantom position 92A is induced by centrifugal force, because the blade 42, gear set 94, and weight 92 are all rotating about axis 58 as shown by arrows 98. The weight 92 rotates in one, and one only, of the planes 66 or 68 in FIG. 6. The weight 92 in FIG. 9 does not describe successive circles such as 70 and 72 in FIG. 6 as does prior art weight 50. A more complex form of the invention is shown in FIG. 10. Note that the angular rotation $\theta$ of the weight 92 is not the same as the blade pitch angle $\alpha$.

In that figure, weight 92 (near the right in the figure) is supported by a crank 100 which pivots about an axis 102 located in a counter-weight support member 103. The support member 103 is attached to an outer blade support ring 105 which rotates with propeller blades 14 about propulsor axis 16. Hub 104 corresponds roughly to hub 56 in FIG. 3. Part 42 of a blade is shown and the blade rotates about an axis 62 as shown by arrow 98. This rotation changes the pitch of blade 42. A lever 106 is connected to the blade 42, and also to a balljoint 108 connected by link 110 to a boss 112 on a unison ring 114. The unison ring 114 is connected by another link 116 to crank 100. Centrifugal force shown by arrow 118 tends to rotate the weight 92 into the dashed position 92A. The rotation to position 92A pulls the boss 112 on the unison ring 114 into position 112A, thereby pulling the lever 106 on the propeller into the position 106A. Thus, a pitch change is induced.

This pitch change is desirable in the event that a malfunction occurs in a pitch-change actuator 120, which is a hydraulic or pneumatic piston which controls the pitch of the propeller by changing the position of the unison ring 114 as shown by positions 122 and 122A. Upon malfunction, the weight 92 takes over and drives the propeller blade 42 to the feathered position discussed in connection with FIG. 4.

When the piston 120 drives the propeller blade 42 into reverse thrust position, as upon landing of an aircraft, the weight 92 is driven into position 92B by the piston 120, against the centrifugal force vector 118.

Figure 11:
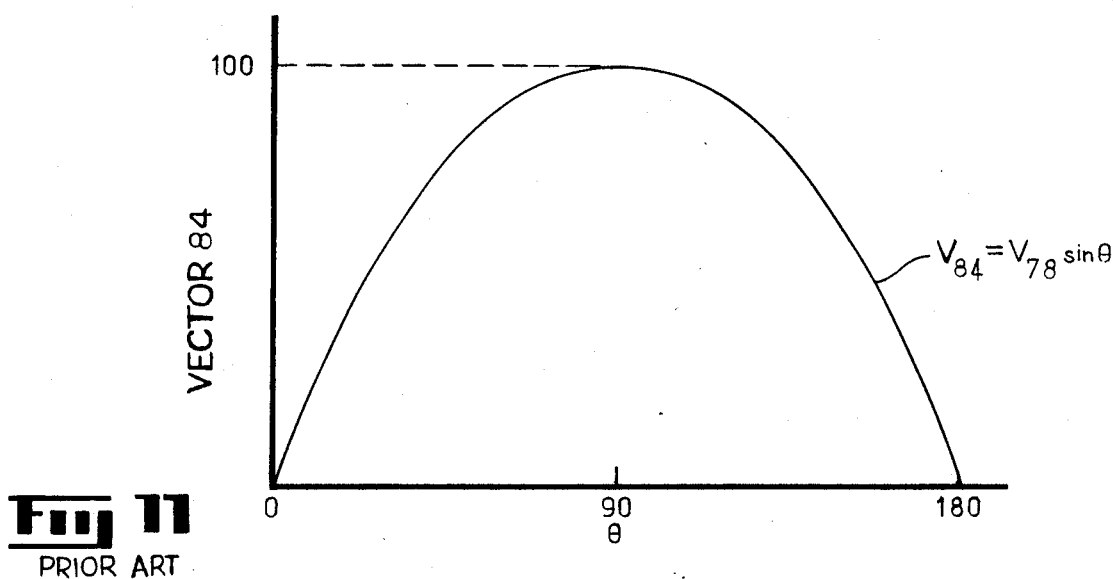
FIG. 11 is a plot of the magnitude of vector 84 of FIG. 7 as a function of angle $\theta$.

The invention can be contrasted with the prior art approach which was described above in the following manner. FIG. 11 is a plot of the magnitude of vector 84 in FIG. 7 as a function of counter-weight rotation angle $\theta$, which angle is equal to the blade pitch angle $\alpha$ in this example. In FIG. 11, vector 84 is given the arbitrary maximum of 100 units. The expression $V_{84} = V_{78} \sin \theta$ in the figure is valid because triangles A, B, C in FIG. 6 and B, D, E in FIG. 7 are similar triangles. Distance 124 in FIG. 6 is part of triangle ABC. It is leg BC. In FIG. 7, distance 124 is distance 126 ($D_{126}$) $\times \sin \theta$. $D_{126}$ is assumed to have length of unity. Thus $BC/DE = D_{126}/V_{78}$, and $V_{84} = V_{78} \sin \theta$.

Figure 12:
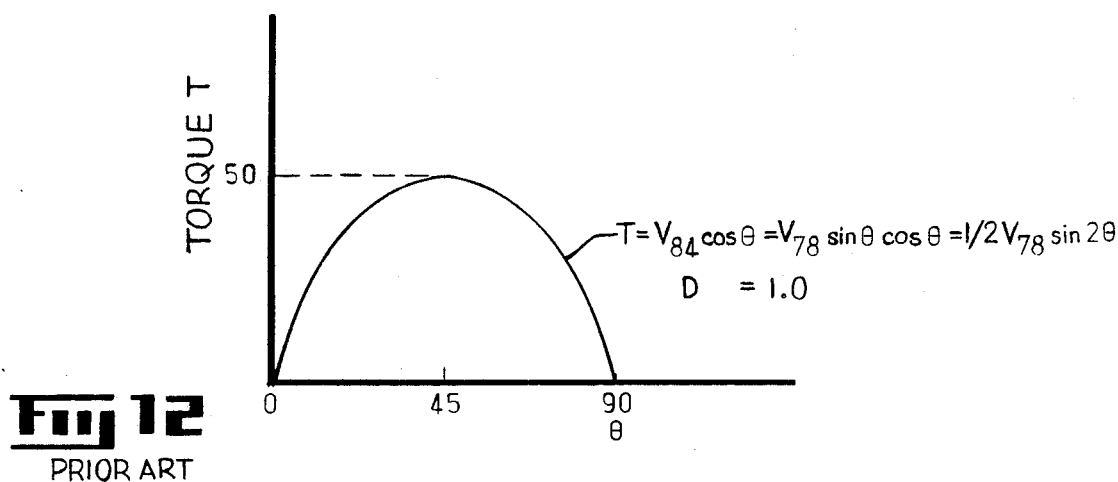
FIG. 12 illustrates the torque generated by a typical prior art pitch control system.

The torque T which vector 84 applies about axis 62 in FIG. 7 is the cross product between $V_{84}$ and the moment arm indicated by vector 126 in FIG. 7. The torque vector is shown as vector 128. It is perpendicular to plane 76 and, of course, to vector 126. Under the geometry shown in FIG. 7, and assuming length 126 is unity, the torque T turns out to be equal to $V_{84} \cos \theta$ as illustrated in FIG. 12. Equivalent expressions for torque also are shown in the figure. The Inventors point out that torque peaks when $\theta$ is 45°, and the peak torque is one-half the peak magnitude of vector 84 in FIG. 11. This is easily understood by consideration of the $\frac{1}{2} V_{78} \sin 2\theta$ expression in FIG. 12. Therefore, the prior art design, in moving the dumbbell through a path to obtain the largest travel of the weights, which is travel from position 54 to 54A, exhibits a torque/angle characteristic as shown in FIG. 12. Torque is at or near zero when the dumbbell is at or near position 54 in FIG. 8, torque peaks when angle $\theta$ in FIG. 6 is at 45°, and torque then descends again to at or near zero when dumbbell reaches position 54A in FIG. 8.

Figure 13:
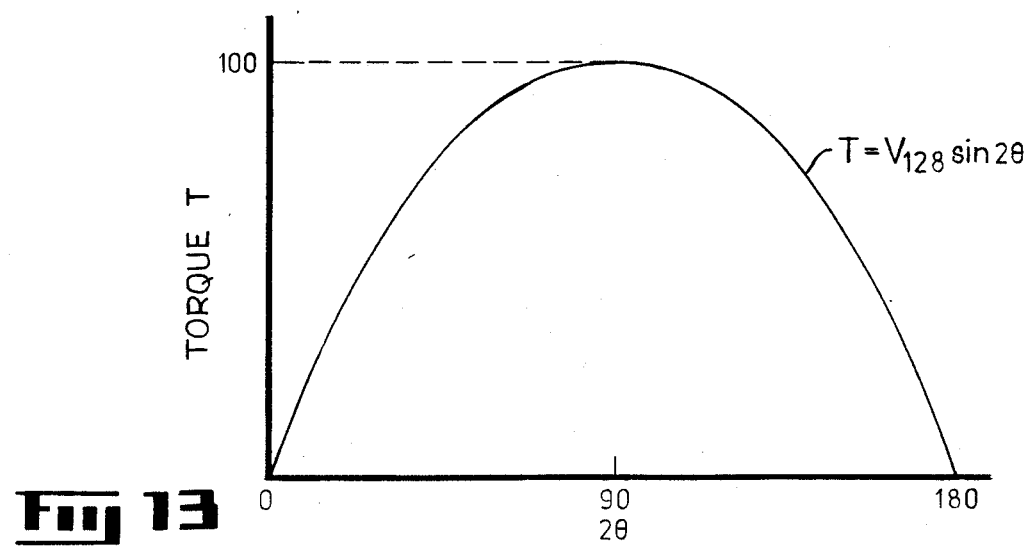
FIG. 13 illustrates the torque generated by the system of the present invention as a function of counter-weight position.

In contrast to this, the present invention has a torque characteristic as shown in FIG. 13. The angle $\theta$ is defined as in FIG. 9 and, analogous to the prior art $\theta$ in FIG. 6, is defined such that the weight 92 in FIG. 9, in order to follow a path providing maximum work, starts off at $\theta$ = zero and travels to $\theta$ = 180°. (Dashed weight 92A is at $\theta$ = 180°.) A torque curve with a corresponding algebraic expression is shown in FIG. 13. $V_{128}$ refers to vector 128 in FIG. 9. The Inventors point out that vector 128 in FIG. 9 is analogous to vector 84 in FIG. 7 in the sense that both vectors represent the centrifugal force vector which moves weight 50 or 92. However, the Inventors' torque is not reduced by any $\cos \theta$ factor as shown in FIG. 12. Thus, the Inventors make fuller use of the force available in vector 128 in FIG. 9.

The Inventors point out that the prior art approach of FIG. 6 has an angle $\theta$ which spans only from zero to 90°, as shown in FIG. 12. In contrast, the present invention allows the counter-weight angle $\theta$ to vary from zero to 180°, as shown in FIG. 13, while varying blade pitch angle α between zero and 90°. Other angular relationships can be obtained by selection of gears and linkage values.

The preceding discussion computed torque as a function of centrifugal force vectors V84 in FIG. 12 and V128 in FIG. 13. However, since these vectors do not remain constant, but change with the position of the weight, the torques will now be computed as a function of different variables, namely, physical parameters.

Figure 14:
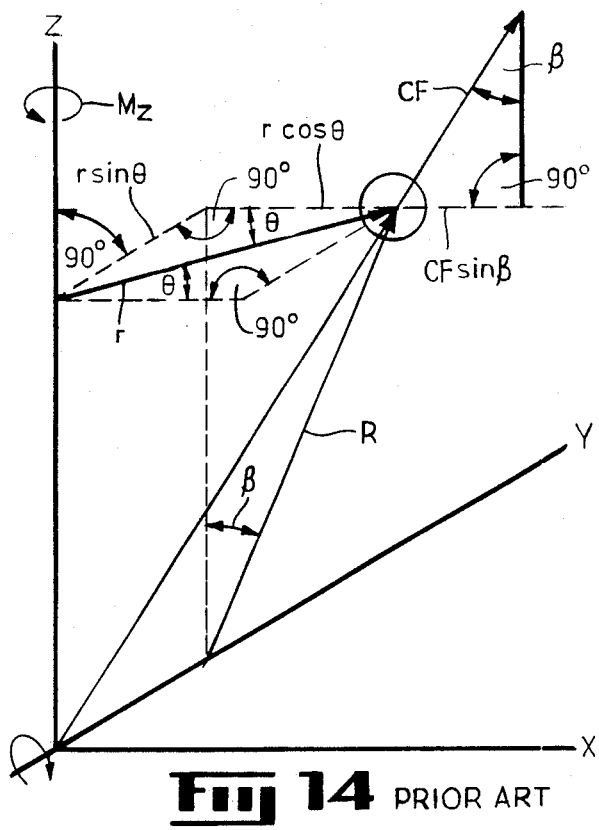
FIGS. 14 and 14A are vector diagrams illustrating in a different form the torque of the prior art systems of pitch control.
Figure 14A:
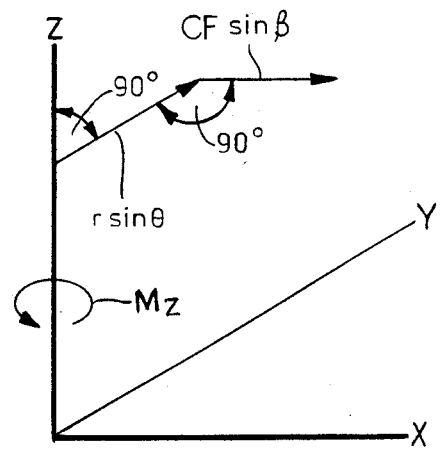

The torque in the prior art approach of FIGS. 3–8 is computed by the following sequence of equations in which CF is centrifugal force,
m is the mass of the counter-weight W,
R is the distance from the weight to the axis of rotation, the y-axis in FIG. 14,
r is the distance from weight 52 to the z-axis in FIG. 14, which is axis 62 in FIG. 7,
α is an angle which, depending on the coordinate system chosen, may equal θ in FIG. 9. α is considered to be the blade pitch angle in FIG. 4 and α is either the actual pitch angle, or the actual pitch angle plus or minus a constant number depending on the orientation of the weight 15 with respect to the blade 42. In either case, α can be viewed as pitch,
β is an angle, also shown in FIG. 6,
ω is the angular speed of revolution of the propeller, in radians per second,
Mz is the moment of the weight of mass m abut the z axis.

$$CF = MR\omega^2 \text{ by definition} \tag{1}$$

$$M_a = (CF \sin\beta)(r \sin\alpha) \text{ from FIG. 14, also shown in FIG. 14A} \tag{2}$$

$$r \cos\alpha = R \sin\beta \text{ from FIG. 14} \tag{3}$$

$$R = \frac{r \cos\alpha}{\sin\beta} \text{ rearrange (3)} \tag{4}$$

$$M_z = (MR\omega^2 \sin\beta) \text{ substitute (1) into } (r \sin\alpha) (2) \tag{5}$$

$$M_z = \left( Mr \frac{\cos\alpha\omega^2}{\sin\beta} \sin\beta \right) \cdot (r\sin\alpha) \text{ substitute (4) into (5)} \tag{6}$$

$$M_z = Mr^2 \cos\alpha\omega^2 \sin\alpha \text{ rearrange} \tag{7}$$

$$M_z = Mr^2 \frac{\sin 2\alpha\omega^2}{2} \text{ substitute trigonometric identity into (7)} \tag{8}$$

$$M_z = \frac{Mr^2}{2} \sin 2\alpha\omega^2 \text{ rearrange} \tag{9}$$

FIG. 14A shows the relevant vectors repositioned, and shows the moment Mz.

Figure 15:
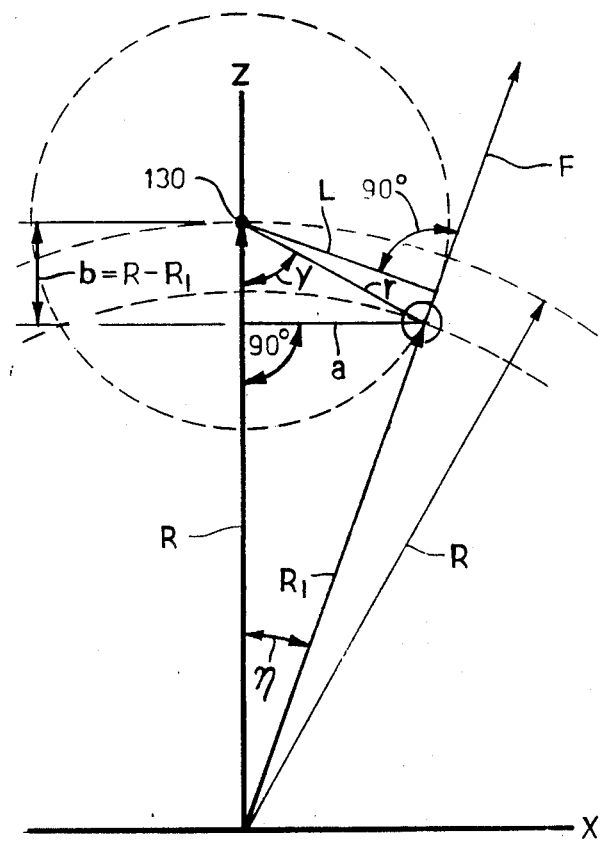
FIGS. 15 and 15A are vector diagrams illustrating in the same form as FIGS. 14 and 14A the torque generated by the system of the present invention.
Figure 15A:
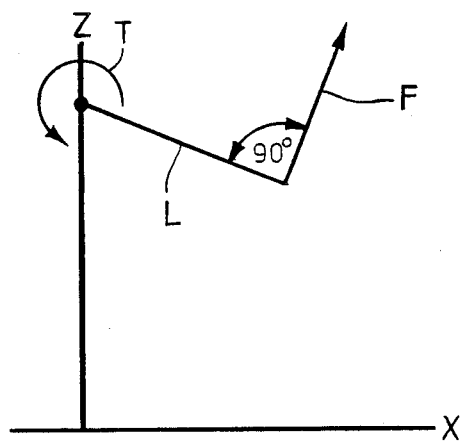

The torque of the present invention is computed by the following sequence of equations, which refer to FIGS. 15 and 15A, and in which R1 is the actual distance from the weight to the axis of rotation.

R is the distance from the center 130, about which the weight rotates, to the axis of rotation and is a constant—(center 130 is on axis 102 in FIG. 9),
γ is the angle between the crank of length r and a reference, namely, the z axis, and the other symbols are self-explanatory. Similar to FIG. 14A, FIG. 15A shows the two relevant vectors in rearranged form.

$$T = LF \text{ definition of torque in FIG. 15} \tag{10}$$

$$F = mR_1\omega^2 \text{ by definition} \tag{11}$$

$$R_1 = R - r\cos\gamma \text{ from FIG. 15} \tag{12}$$

$$F = m(R - r\cos\gamma)\omega^2 \text{ substitute (12) into (11)} \tag{13}$$

$$a = r\sin\gamma \text{ from FIG. 15} \tag{14}$$

$$R\sin\theta = L \text{ from FIG. 15} \tag{15}$$

$$\sin = \frac{a}{R_1} = \frac{r\sin\gamma}{R - r\cos\gamma} \text{ from FIG. 15 and substitution from (12) \& (14)} \tag{16}$$

$$L = \frac{R(r\sin\gamma)}{R - r\cos\gamma} \text{ combine equations 15 and 16} \tag{17}$$

$$T = \frac{R(r\sin\gamma)}{R - r\cos\gamma} m(R - r\cos\gamma)\omega^2 \text{ substitute (17) and (13) into (10)} \tag{18}$$

$$T = mRr\sin\gamma\omega^2 \text{ simplify (18)} \tag{19}$$

As stated above, angle α in equation 2 is the blade pitch angle. This angle can be related to angle γ in equation 19 by assuming a specific ratio in the linkage 94 in FIG. 9. Assuming a 2:1 ratio (i.e., gear 94B has twice the teeth of gear 94A) then $$\gamma = 2\alpha \tag{20}$$

With this substitution in equation 19, and dividing equation 19 by equation 9, the result is $$T = \frac{2R}{r} Mz \tag{21}$$

Thus, the torque T of this invention is greater than that of the prior art approach by a factor of 2R/r.

The Inventors point out that, in the equations above, the crank 100 in FIG. 10 (which is described as having length r in FIG. 15) was assumed to lack mass. However, in actual fact, the crank will have a finite mass and, as a result, the actual torque will be greater than that computed in equations such as 19. Nevertheless, equation 19 validly computes the component of the total torque attributable to weight 92 in FIGS. 9 and 10.

An invention has been described wherein a weight 92 in FIG. 10 travels along with the rotation of an aircraft propeller blade 42, but can also rotate about an axis 102 upon the failure of a pitch-change piston 120. During the rotation about axis 102, the weight 92 stays within a plane parallel to the plane of rotation of the propeller. The plane of rotation is that defined by circle 98 in FIG. 9, and is parallel to planes 66 and 68 in FIG. 6. Such rotation drives the weight to phantom position 92A in FIG. 10, thereby changing the pitch of the propeller 42 by rotation of lever 106 into phantom position 106A. The rotation to phantom position 16A is induced by centrifugal force. The work done by the weight 92 during rotation, and which is available to force the propeller blade 42 into feathered position, is the integral of the dot product of centrifugal force F and distance dl, or $$W = \int F \cdot dl$$

The integrated distance is the change in radius ΔR in FIG. 10. This integrated distance will, in general, be greater than the analogous distance for the prior art device discussed above, which is the difference between distances 88 and 90 in FIG. 8. In a sense, the rotation shown by arrow 64 in FIG. 5 of the prior art device and the rotation of the present invention to position 92A in FIG. 9 are similar: vectors 84 in FIG. 7 and 128 in FIG. 9 are analogous. But, the present invention allows a greater amount of work to be obtained, for similar lengths of arm 124 in FIG. 9 as compared with arm 126 in FIG. 7.

Figure 16:
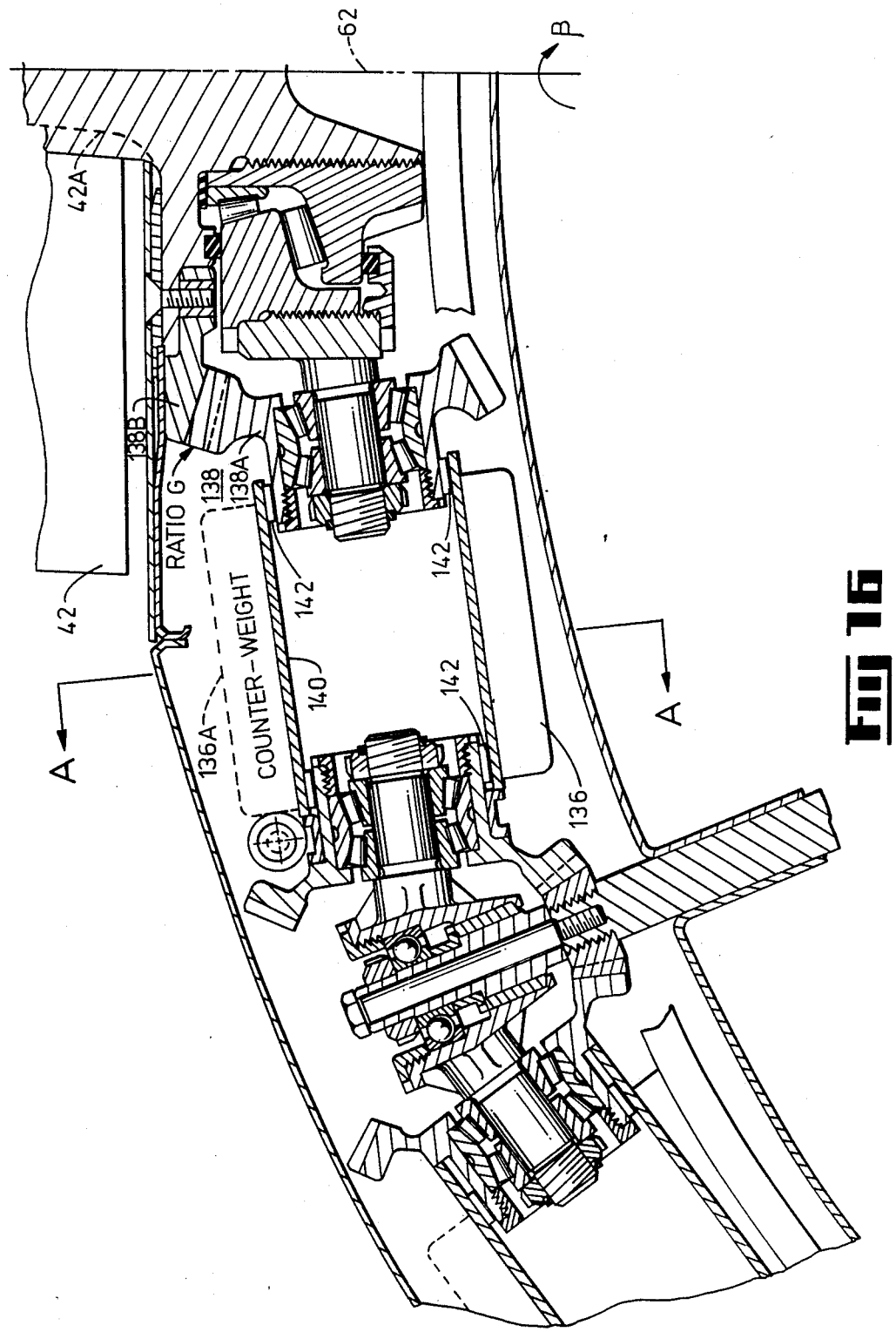
FIG. 16 illustrates a partial cross-sectional view of the propulsor system employing a second form of the present invention.

FIG. 16 illustrates a schematic of another form of the invention, wherein a counter-weight 136 coupled to a gear set 138 rotates a propeller blade 42 into a feathered position shown by phantom blades 42A. The rotation of the counter-weight 136 into phantom position 136A is induced by centrifugal force because the blade 42, gear set 138, and counter-weight 136 are all rotating about axis 16 of propulsor 22.

Figure 17:
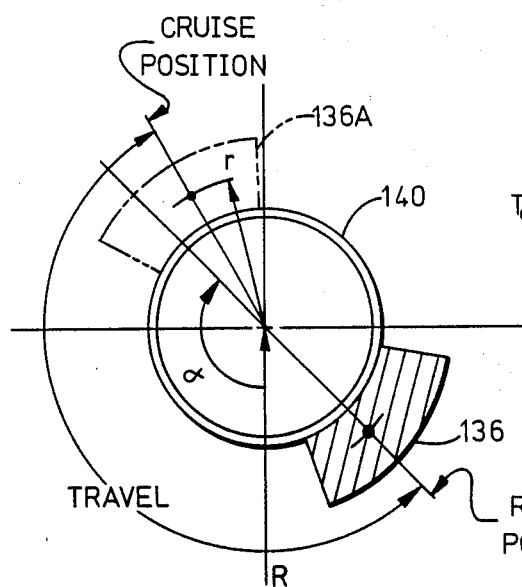
FIG. 17 is a cross-sectional view taken along line A—A of FIG. 16.
Figure 18:
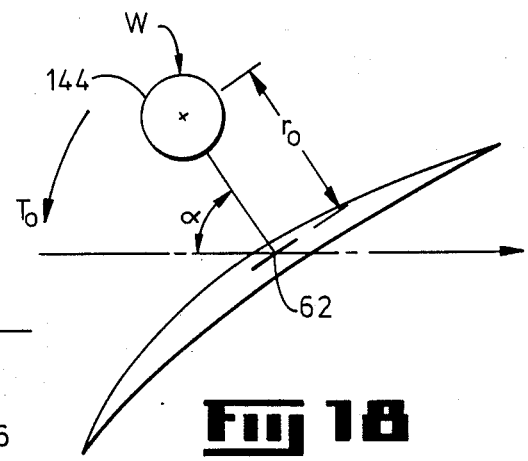
FIG. 18 schematically illustrates the forces in a prior art counter-weight system for blade feathering.

The counter-weight 136 is attached to an outer surface of an elongated member 140. The member 140 is preferably tubular as shown but could be solid. The member 140 includes gear teeth 142 formed on each end thereof, preferably internally, which mate with matching gear teeth of gear assembly or gear set 138. In this embodiment, the tubular member 140 is part of the interconnection (unison ring) coupling the individual propeller blades 42 for conjoint pitch change. The counter-weights 136 rotate radially outward for moving the blades 42 to a desired pitch/feather angle. Since the rotation is in a radial plane, albeit in a plane parallel to and encompassing the propeller axis 16, the prior analysis of generated torque is still applicable thus enabling reduction of the mass of the counter-weights as compared to the prior art. More particularly, the system of FIG. 16 can generate up to fourteen times the torque of a typical prior art system. For example, FIG. 17 illustrates a conventional system in which the torque $T_o$ is represented by:

$$T_o = W/2gr_o^2\omega^2 \sin 2\theta,$$

where $\omega$ is propeller speed, g is the gravitational constant, $r_o$ is the radius of rotation of counter-weight 144 (i.e., the distance from the blade axis of rotation 62 to the mass center of weight 144), W is the weight of counter-weight 144 and $\theta$ is the angle between the rotational plane of the propeller and the counter-weight. In contrast, referring to FIG. 18, the present invention as shown in FIG. 16 provides a torque T represented by:

$$T = G \frac{W}{g} Rr\omega^2 \sin\theta,$$

where G is the gear ratio, R is the distance from the propeller axis to the axis of rotation of the counter-weight 136 and the other terms are defined the same as for FIG. 17. If the torque T is divided by torque $T_o$ and the equation simplified, it can be shown that:

$$\frac{T}{T_o} = \frac{G2Rr\sin\theta}{r_o^2 \sin^2\theta}$$

If values for one form of unducted fan gas turbine engine of the type shown in FIG. 2 are substituted as follows:
G=2.363
R=26.25 inches
r=1.45 inches
θ=45 degrees
$r_o$=3 inches
then $T/T_o$=14.

Figure 19:
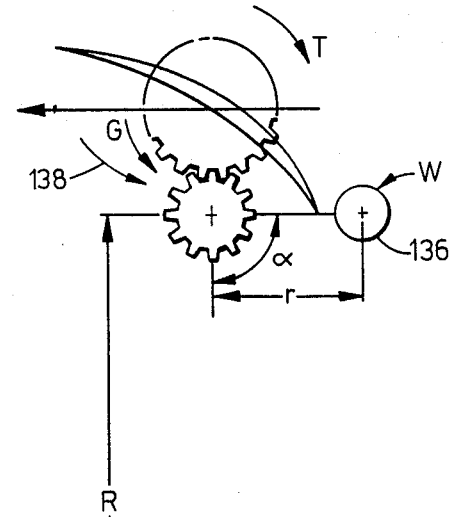
FIG. 19 schematically illustrates the forces in a blade feathering system in accordance with the present invention.
Figure 20:
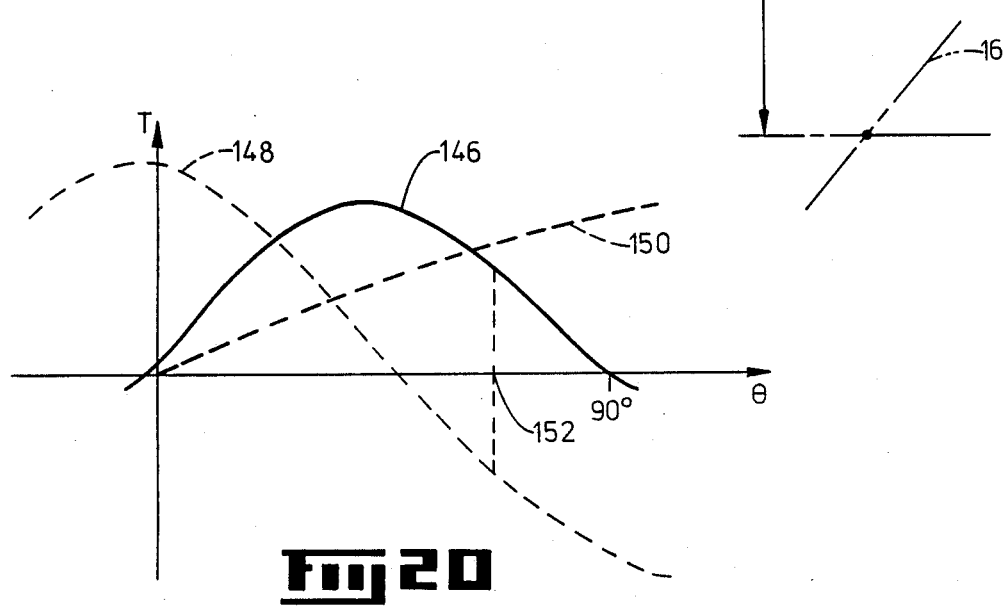
FIG. 20 illustrates torque generated by the systems of FIGS. 17 and 18 compared to torque generated by a blade.

An advantage of the mechanism of FIG. 16 is the ability to adjust the engagement position between the gear teeth of member 140 and the gear set 138. In so doing, the coarse or feather position can be selected at some predetermined non-zero pitch angle. For example, it may be desirable to force the blade to an angle at which some power can be generated from the engine even though pitch control has been lost. This can be better understood by reference to FIG. 19 which illustrates at line 146 a blade torque profile, i.e., the torque resistance to rotation of a blade over its range of pitch change as compared to the torque 148 generated by the counter-weight described with regard to FIGS. 16-18. The net torque between lines 146 and 148 illustrates that a blade pitch position 152 can be obtained by manipulation of the present invention without placing the blade at either of its extreme positions, i.e., full coarse pitch or full fine pitch.

While the invention has been described in terms of specific embodiments, it is intended that the invention not be limited to those embodiments but be interpreted within the spirit and scope of the appended claims.

We claim:
1. An aircraft propulsor system comprising:
a gas turbine engine for generating a high energy gas stream;
a propulsor stage coupled to said engine, said propulsor stage including first and second intermeshed counterrotating turbine blade sets driven by said gas stream and fore and aft multi-bladed propellers extending radially outward of said propulsor stage, each of said blade sets being operatively connected to corresponding ones of said fore and aft multi-blade propellers, one of said blade sets having radially inwardly extending blades and a radially outer blade support ring, the other of said blade sets having radially outwardly extending blades and a radially inner blade support ring and each of said propellers including a plurality of propeller blades;
controlling means coupled to said propeller blades of said fore and aft propellers for controlling the pitch thereof;
propeller blade pitch feathering means for automatically rotating said propeller blades to a predetermined pitch angle upon failure of said controlling means, said feathering means comprising:
a unison ring interconnecting said blades of a corresponding one of said propellers for effecting conjoint pitch change of each of the blades;
a plurality of counter-weights rotatably attached to said unison ring for rotation therewith about a rotational axis of said one of said propellers, each of said counter-weights being rotatable about an axis of rotation rotatable about said propeller rotational axis, and said counter-weights being rotatable only in a direction which effects radial displacement of said counter-weights with respect to said propeller axis; and means coupled to said counter-weights for driving said propeller blades to said predetermined pitch when said counter-weights rotate radially outward from said propeller axis.

2. The system of claim 1 wherein said axes of rotation of said counter-weights are parallel to said propeller axis, said counter-weights being rotatable only in a plane perpendicular to said propeller axis.

3. The system of claim 1 wherein said axes of rotation of said counterweights lie on tangent lines of a circle circumscribing said propeller axis in a plane perpendicular to said propeller axis, said counter-weights being rotatable only in a plane parallel to and including said propeller axis.

4. The system of claim 2 and including a plurality of means for rotatably connecting said counter-weights to said unison ring.

5. The assembly of claim 3 and including a plurality of means for rotatably connecting said counter-weights to said unison ring.

6. The system of claim 4 wherein each of said connecting means comprises:

support means connected to said radially outer blade support ring and rotatable therewith;

a lever pivotably mounted at an intermediate point thereof to said support means, a corresponding one of said counter-weights being attached to one end of said lever, another end of said lever being pivotably attached to said unison ring whereby rotation of said counter-weight about said support means imparts a force to said unison ring to effect rotation thereof about said propeller axis for changing the pitch of said propeller blades.

7. The system of claim 5 wherein each of said connecting means comprises:

an elongated member having gear teeth on each end thereof, one of said counter-weights being attached to a surface of said elongated member;

a gear assembly coupled to each of said propeller blades, said gear assembly being arranged to effect a pitch change of said blades and having at least one gear adapted for driving engagement with said gear teeth of said elongated member; and said elongated member extending between adjacent gear assemblies for interconnecting said assemblies for effecting a pitch change when said counter-weight forces rotation of said elongated member.

8. The system of claim 7 and including means for changing the position of said elongated member with respect to said one gear for selecting said predetermined pitch angle.

9. An aircraft propeller blade pitch feathering system comprising:

a propeller having a plurality of blades operatively connected for conjoint rotation about a propeller axis, each of said blades having a root portion and a foil portion and having a blade axis of rotation extending from said root portion through said foil portion;

means interconnecting said root portion of each of said blades for effecting concurrent common angular rotation of each of said blades about its corresponding blade axis;

a plurality of counter-weights rotatably connected to said interconnecting means for rotation therewith about said propeller axis, each of said counter-weights having an axis of rotation rotating about said propeller axis and lying on tangent lines of a circle circumscribing said propeller axis in a plane perpendicular thereto;

each of said counter-weights being connected for rotation about a corresponding one of said counter-weight axes in a radial displacement motion with respect to said propeller axis; and means coupled to said counter-weights for driving each of said blades to a feather position when said counter-weights rotate radially outer of said propeller axis.

10. The system of claim 9 wherein said interconnecting means comprises:

an elongated member having gear teeth on each end thereof, one of said counter-weights being attached to a surface of said elongated member;

a gear assembly coupled to each of said propeller blades, said gear assembly being arranged to effect a pitch change of said blades and having at least one gear adapted for driving engagement with said gear teeth of said elongated member; and said elongated member extending between adjacent gear assemblies for interconnecting said assemblies for effecting a pitch change when said counter-weight forces rotation of said elongated member.

11. The system of claim 10 and including means for changing the position of said elongated member with respect to said one gear for selecting said predetermined pitch angle.

* * * * *